June 18, 1929.  C. L. MEADOWS  1,718,168
CAR AIR BRAKE RELEASE
Filed Jan. 18, 1928   2 Sheets-Sheet 1
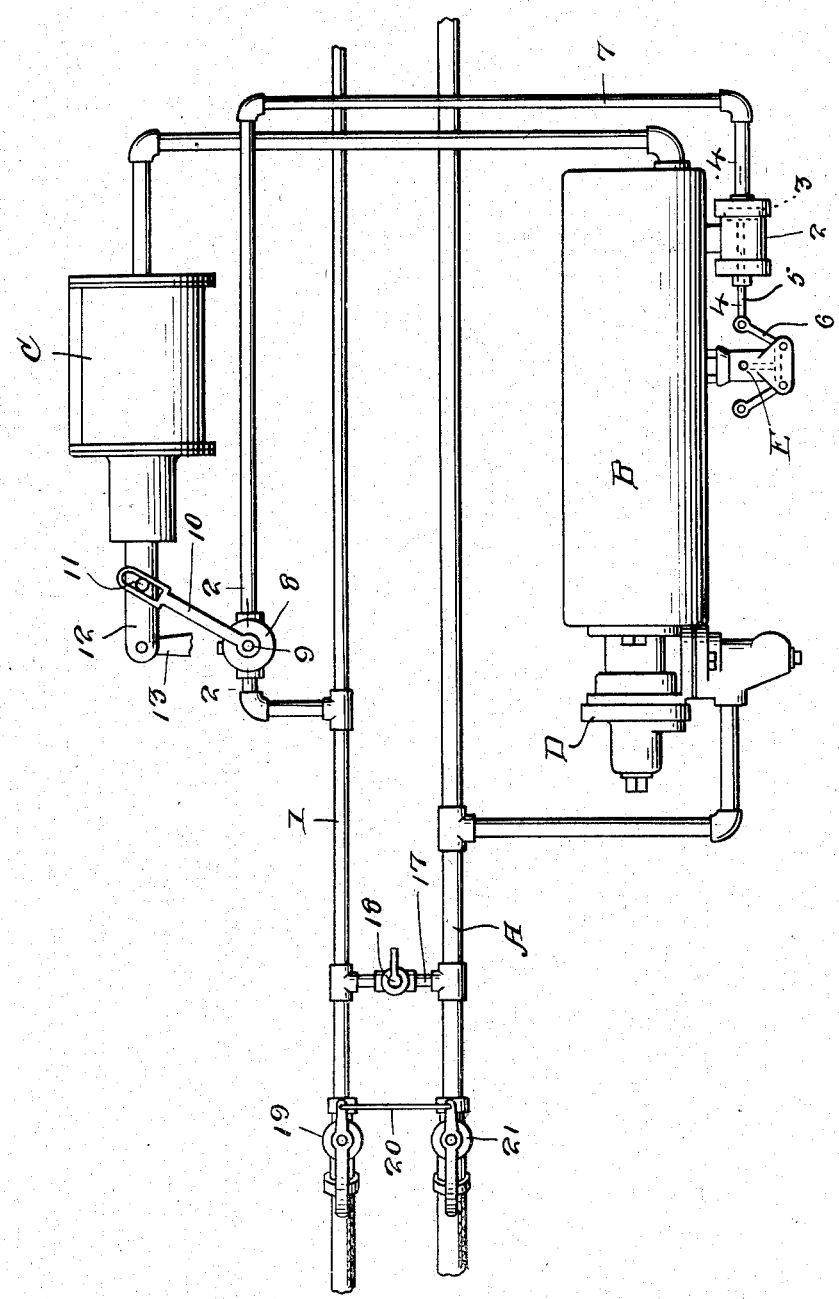

June 18, 1929.  C. L. MEADOWS  1,718,168
CAR AIR BRAKE RELEASE
Filed Jan. 18, 1928   2 Sheets-Sheet 2
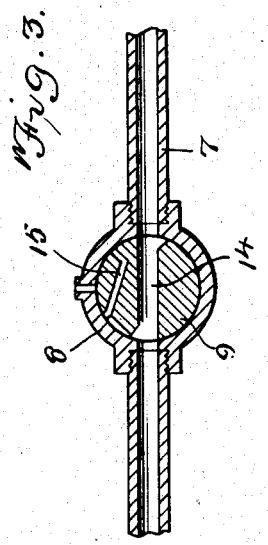
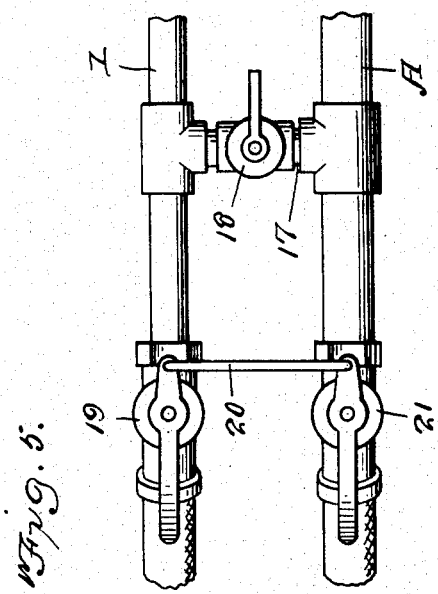
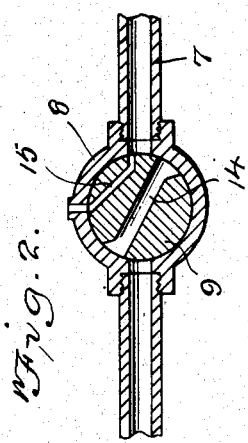
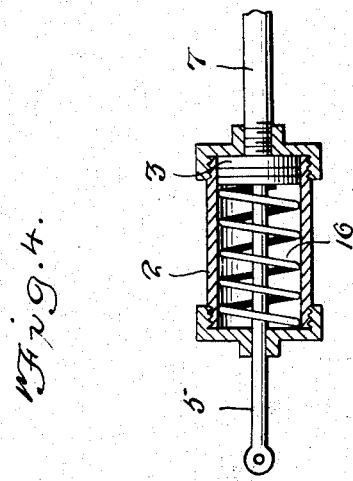

Patented June 18, 1929.

1,718,168

UNITED STATES PATENT OFFICE.

CLYDE L. MEADOWS, OF PORTSMOUTH, OHIO.

CAR AIR-BRAKE RELEASE.

Application filed January 18, 1928. Serial No. 247,660.

This invention relates to means for releasing the brakes of those cars in a train which fail to release when the air pressure in the main brake air line is charged or recharged to a predetermined pressure and brakes fail to release. The general object of the invention is to provide an auxiliary air line, with means operated by the air pressure in the same for opening the bleed cocks of the auxiliary reservoirs to those cars whose brakes fail to release, said auxiliary line being provided with a controlling valve in the cab of the locomotive.

Another object of the invention is to provide a valved connection between each section of the main brake line and each section of the auxiliary line so that by opening the valve in said connection, the air in the main line can be used for opening the bleed cock to release the brakes of a car or several cars on a siding, for instance.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic view showing the invention applied to the brake means of a car.

Figure 2 is a section on line 2—2 of Figure 1, showing the valve in one position.

Figure 3 is a similar view showing the valve in another position.

Figure 4 is a section on line 4—4 of Figure 1.

Figure 5 is an enlarged plan view showing the connection between the two air lines.

In these drawings, A indicates the main brake line, B the auxiliary reservoir, C the brake cylinder, D the triple valve and E the bleed cock for the auxiliary reservoir, these parts being of the ordinary construction.

In carrying out my invention, I provide an auxiliary air line 1 which is made similar to the line A and is connected with the air compressor, or an auxiliary compressor in the locomotive and the passage of air therethrough is controlled by an engineer's valve. A cylinder 2 is supported adjacent the auxiliary reservoir and the piston 3 therein has its rod 5 connected with an arm 6 of the bleed cock E. A branch pipe 7 connects one end of this cylinder with the line 1, a valve casing 8 being placed in the branch with the stem of the valve 9 therein connected to an arm 10 which has its outer end slotted to receive a pin 11 carried by the piston rod 12 of the piston in the brake cylinder, said rod 12 being connected with the brake lever 13, as usual. The valve 9 is formed with a port 14 and with a bleed port 15.

When the brakes are applied, the movement of the piston rod 12 will move the arm 10 to a position where the port 14 will open the branch line 7 to the line 1 so that air from said line 1 will pass through the branch line into the cylinder 2 and push the piston 3 forwardly against the action of its spring 16 and thus open the bleed cock E so as to drain the auxiliary reservoir B. Thus if the brakes of one or more cars of a train should remain applied after the brake line pressure has been reduced to cause the triple valve ordinarily to act to place the brake cylinder in communication with the atmosphere the engineer would open the valve in the auxiliary line 1, so that air would pass through the line 1 and through the valves 8 of those cars, the brakes of which have failed to release and through the branch lines 7 into the cylinders 2 so as to cause the pistons in said cylinders 2 to open the cocks E and thus drain the auxiliary reservoirs so that air remaining in the brake cylinders 3 will escape and thus cause the brakes of these cars to be released. It will be seen that the air from line 1 cannot pass through the branches 7 of the cars, the brakes of which have been released, as the valves 8 of such cars have been moved to closed position by the retraction of the piston rods 12. As soon as each valve 8 closes, the bleed port 15 will bleed the branch 7 and the cylinder 2 so that the spring 16 will move the piston 3 back to its original position, thus closing the bleed cock E.

Each section of the main line A is connected to each section of the auxiliary line 1 by a pipe 17 which contains a hand operated valve 18. Thus when it is desired to remove the brakes of a car on a siding, for instance, it is simply necessary to open the valve 18 to permit the air in the main line A to pass through the pipe 17 into the pipe 1, from which it will pass through the branch, it being understood that the valve 8 is open to the cylinder 2 to cause the piston thereof to leave the auxiliary reservoir and thus the brakes of said car will be released.

Each cock 19 in the line 1 has its handle connected by a link 20 with the companion cock 21 of the main line A so that the cocks will be moved in unison. This will prevent the engineer from using the auxiliary line 1 when a cock 21 in the main line is closed.

From the foregoing it will be seen that the engineer can release the brakes of those cars, the brakes of which fail to release when the air pressure in the main brake line is charged or recharged to a predetermined pressure, so that it is not necessary to operate the bleed cocks by hand.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. In combination with a brake system of a train, means operated from the cab of the locomotive for opening the bleed cocks of the auxiliary reservoirs of those cars whose brakes fail to release when the brake line pressure is charged or recharged to a predetermined pressure, such means comprising an auxiliary air line, a cylinder associated with each auxiliary reservoir, a branch line connecting each cylinder with the auxiliary line, a piston in each cylinder, a rod connected with the said piston and also connected with an arm of the bleed cock of the auxiliary reservoir to open said cock when the piston is moved forwardly by the air pressure in the branch line, a valve in said branch line, means for opening the valve when the piston of the brake cylinder is projected.

2. In combination with a brake system of a train, means operated from the cab of the locomotive for opening the bleed cocks of the auxiliary reservoirs of those cars whose brakes fail to release when the brake line pressure is charged or recharged to a predetermined pressure, such means comprising an auxiliary air line, a cylinder associated with each auxiliary reservoir, a branch line connecting each cylinder with the auxiliary line, a piston in each cylinder, a rod connected with the said piston and also connected with an arm of the bleed cock of the auxiliary reservoir to open said cock when the piston is moved forwardly by the air pressure in the branch line, a valve in said branch line, means for opening the valve when the piston of the brake cylinder is projected, said means comprising an arm on the valve having a slotted outer end and a pin on the piston rod of the brake cylinder engaging the slot and a bleed port in the valve for bleeding the branch pipe and its cylinder when the valve is in closed position.

3. In combination with the brake system of a train, an auxiliary air line, a cylinder associated with each auxiliary reservoir, a branch line connecting each cylinder with the auxiliary line, a piston in each cylinder, a piston rod connecting each piston with an arm of the bleed cock of each auxiliary reservoir, a spring for normally holding the piston retracted with the bleed cock closed, a valve in each branch line, means for holding the valve open when the brakes are applied, a bleed cock in each valve for draining the branch line and cylinder when the valve is closed, a pipe connecting each section of the main line with each section of the auxiliary line, a hand operated valve in each pipe and a link for connecting each cock in the main line to the companion cock of the auxiliary line.

In testimony whereof I affix my signature:

CLYDE L. MEADOWS.